(12) United States Patent
Higuchi et al.

(10) Patent No.: US 11,107,597 B2
(45) Date of Patent: Aug. 31, 2021

(54) CASK AND METHOD OF PRODUCING NEUTRON SHIELD

(71) Applicant: HITACHI ZOSEN CORPORATION, Osaka (JP)

(72) Inventors: Akira Higuchi, Osaka (JP); Kenta Hamada, Osaka (JP); Hiroyuki Morita, Osaka (JP); Akihiro Shin, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 16/636,426

(22) PCT Filed: Jul. 25, 2018

(86) PCT No.: PCT/JP2018/027989
§ 371 (c)(1),
(2) Date: Feb. 4, 2020

(87) PCT Pub. No.: WO2019/031251
PCT Pub. Date: Feb. 14, 2019

(65) Prior Publication Data
US 2020/0176144 A1 Jun. 4, 2020

(30) Foreign Application Priority Data
Aug. 8, 2017 (JP) .............................. JP2017-153612

(51) Int. Cl.
*G21F 5/10* (2006.01)
*G21F 3/00* (2006.01)
(Continued)

(52) U.S. Cl.
CPC .................. *G21F 5/10* (2013.01); *G21F 3/00* (2013.01); *G21F 5/008* (2013.01); *G21C 19/32* (2013.01)

(58) Field of Classification Search
CPC ... G21F 5/10; G21F 3/00; G21F 5/008; G21C 19/32
(Continued)

(56) References Cited

U.S. PATENT DOCUMENTS 6,625,247 B1  9/2003 Ohsono et al.
2002/0152841 A1 10/2002 Ohsono et al.
(Continued)

FOREIGN PATENT DOCUMENTS

JP  2001-83281 A  3/2001
JP  2001-083296 A  3/2001
(Continued)

OTHER PUBLICATIONS

PCT/IB/326 Notification Concerning Transmittal of International Preliminary Report on Patentability including PCT/IB/373 and PCT/ISA/237 (in Japanese).
(Continued)

*Primary Examiner* — Nicole M Ippolito
(74) *Attorney, Agent, or Firm* — Pillsbury Winthrop Shaw Pittman, LLP

(57) ABSTRACT

A cask includes a cask body, an outer cylinder, a plurality of fins, and a plurality of neutron shields. The cask body has a tubular shape around a central axis and is capable of housing fuel assemblies. The outer cylinder has a tubular shape surrounding the cask body. The fins are aligned in a circumferential direction in a tubular space formed between the cask body and the outer cylinder, and connect an outer peripheral surface of the cask body and an inner peripheral surface of the outer cylinder to divide the tubular space into a plurality of divided spaces. The neutron shields contain a neutron shielding material with which the divided spaces are filled. Each neutron shield includes a void portion extending in the axial direction along the central axis. Accordingly, it is possible to reduce stress that may be exerted on the outer cylinder or other components by thermal expansion of the neutron shielding material when the fuel assemblies are housed in the cask.

7 Claims, 6 Drawing Sheets

(51) Int. Cl.
*G21F 5/00* (2006.01)
*G21F 5/008* (2006.01)
*G21C 19/32* (2006.01)

(58) Field of Classification Search
USPC ......... 250/505.1, 506.1, 507.1, 515.1, 517.1, 250/518.1, 519.1
See application file for complete search history.

(56) References Cited

U.S. PATENT DOCUMENTS

| | | | |
|---|---|---|---|
| 2004/0062338 A1 | 4/2004 | Ohsono et al. | |
| 2005/0224729 A1* | 10/2005 | Tamaki | G21F 5/008 250/507.1 |
| 2008/0265182 A1 | 10/2008 | Singh et al. | |
| 2012/0037632 A1 | 2/2012 | Singh et al. | |

FOREIGN PATENT DOCUMENTS

| | | |
|---|---|---|
| JP | 2001-318187 A | 11/2001 |
| JP | 2002-311187 A | 10/2002 |
| JP | 2003-149382 A | 5/2003 |
| JP | 2004-125763 A | 4/2004 |

OTHER PUBLICATIONS

PCT/IB/338 Notification of Transmittal of Translation of the International 3RELIMINARY Report on Patentability including PCT/IB/373 and PCT/ISA/237 (in English).
International Search Report dated Oct. 23, 2018 issued in corresponding International Patent Application No. PCT/JP2018/027989 with English translation.

* cited by examiner

US 11,107,597 B2

CASK AND METHOD OF PRODUCING NEUTRON SHIELD

CROSS-REFERENCE TO RELATED APPLICATIONS

This Application is the U.S. National Stage of PCT/JP2018/027989, filed Jul. 25, 2018, which claims priority to Japanese Patent Application No. 2017-153612, filed Aug. 8, 2017, the contents of each of which are incorporated herein by reference in entirety.

TECHNICAL FIELD

The present invention relates to a cask and a method of producing neutron shields.

BACKGROUND ART

Spent fuel assemblies removed from nuclear reactors (hereinafter, simply referred to as "fuel assemblies") are conventionally stored in storage pools in buildings and cooled over several to a dozen or so years. The fuel assemblies are then put into dry storage over several tens of years in intermediate storage facilities or other facilities. Since the fuel assemblies continue to emit radiation such as neutrons and gamma rays, they are housed in a cask serving as a special container during transport and dry storage. The cask includes a cask body that houses fuel assemblies, an outer cylinder surrounding the cask body, and a plurality of fins aligned in a circumferential direction between the cask body and the outer cylinder. Spaces sectioned by the cask body, the outer cylinder, and the fins are filled with a neutron shielding material containing a resin. The neutron shielding material attenuates the radiation of neutrons emitted from the fuel assemblies to the outside of the cask.

Japanese Patent Application Laid-Open Nos. 2004-125763 (Document 1) and 2001-318187 (Document 2) disclose casks capable of efficiently conducting decay heat emanating from fuel assemblies to outer cylinders. In these casks, neutron shields molded in another place are inserted into spaces sectioned by a cask body, the outer cylinder, and heat conduction fins. The neutron shields are formed by filling internal spaces of a copper or aluminum honeycomb member with a resin (neutron shielding material).

Incidentally, in a cask, the neutron shielding material has a higher thermal expansion coefficient than materials (e.g., carbon steel) used for the cask body and the outer cylinder, and therefore great stress may be exerted on the outer cylinder or other components by thermal expansion of the neutron shielding material when the fuel assemblies are housed in the cask. In design of a cask, such stress is desirably as small as possible.

SUMMARY OF INVENTION

The present invention is intended for a cask, and it is an object of the present invention to reduce stress that may be exerted on an outer cylinder or other components due to thermal expansion of a neutron shielding material.

The cask according to the present invention includes a cask body having a tubular shape with a central axis as a center and capable of housing a fuel assembly, a tubular outer cylinder surrounding the cask body, a plurality of fins aligned in a circumferential direction in a tubular space formed between the cask body and the outer cylinder, and connecting an outer peripheral surface of the cask body and an inner peripheral surface of the outer cylinder to divide the tubular space into a plurality of divided spaces, and a plurality of neutron shields containing a neutron shielding material with which the plurality of divided spaces is filled. Each neutron shield includes a void portion that extends in an axial direction along the central axis.

The present invention can reduce stress that may be exerted on the outer cylinder or other components by thermal expansion of the neutron shielding material.

In a preferable embodiment of the present invention, each neutron shield further includes a molded pipe portion including a hollow portion that is the void portion, and a filled portion serving as the neutron shielding material with which a space between the molded pipe portion and an outer edge of a divided space is filled.

In this case, preferably, the molded pipe portion is formed of a molded member of a neutron shielding material.

The molded pipe portion may include a first precast member disposed on one side of the void portion in a section perpendicular to the axial direction, and a second precast member disposed on the other side of the void portion in the section and joined to the first precast member to surround the void portion with the first precast member.

Preferably, a joint between the first precast member and the second precast member has a labyrinth structure.

In another preferable embodiment of the present invention, the void portion has a shape extending in the circumferential direction in a section perpendicular to the axial direction.

The present invention is also intended for a method of producing a neutron shield in a cask. In the method of producing a neutron shield, the cask includes a cask body having a tubular shape with a central axis as a center and capable of housing a fuel assembly, a tubular outer cylinder surrounding the cask body, and a plurality of fins aligned in a circumferential direction in a tubular space formed between the cask body and the outer cylinder, and connecting an outer peripheral surface of the cask body and an inner peripheral surface of the outer cylinder to divide the tubular space into a plurality of divided spaces. The method of producing the neutron shield includes disposing a molded pipe portion in a divided space, the molded pipe portion including a hollow portion extending in an axial direction along the central axis, and forming a filled portion by filling a space between the molded pipe portion and an outer edge of the divided space with a neutron shielding material with fluidity and hardening the neutron shielding material.

These and other objects, features, aspects and advantages of the present invention will become more apparent from the following detailed description of the present invention when taken in conjunction with the accompanying drawings.

DESCRIPTION OF EMBODIMENTS

Figure 1:
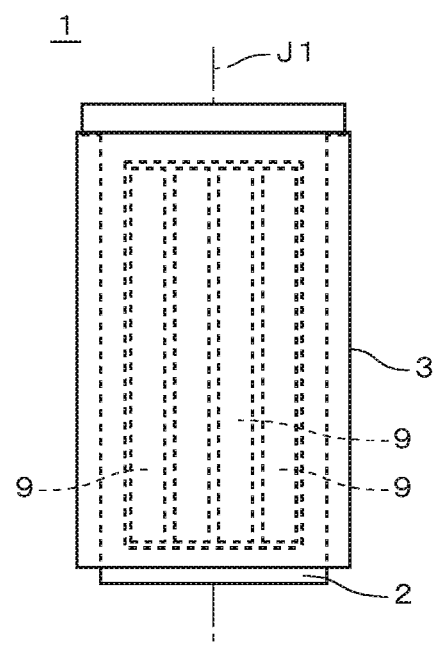
FIG. 1 illustrates an outer appearance of a cask.

FIG. 1 illustrates an outer appearance of a cask 1 according to an embodiment of the present invention. The cask 1 is a container capable of housing fuel assemblies 9 (i.e., spent fuel assemblies). For example, the cask 1 has a substantially circular columnar shape around a central axis J1 pointing in an up-down direction in FIG. 1. In the following description, the up-down direction along the central axis J1 in FIG. 1 is also referred to as an "axial direction."

Figure 2:
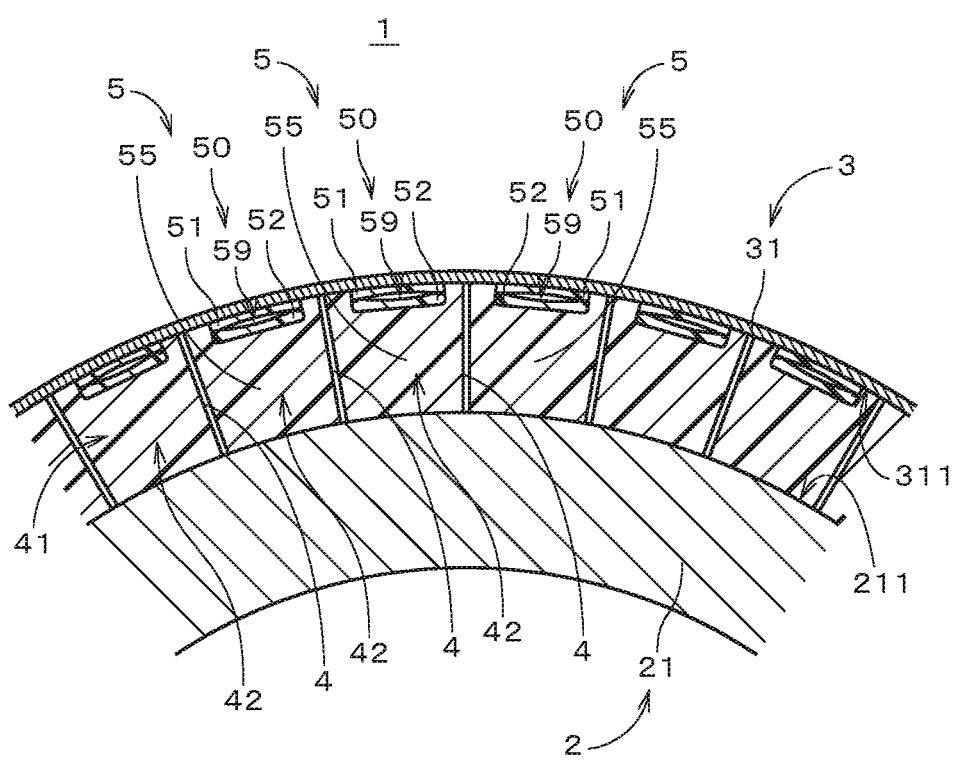
FIG. 2 is a sectional view of the cask.
Figure 3:
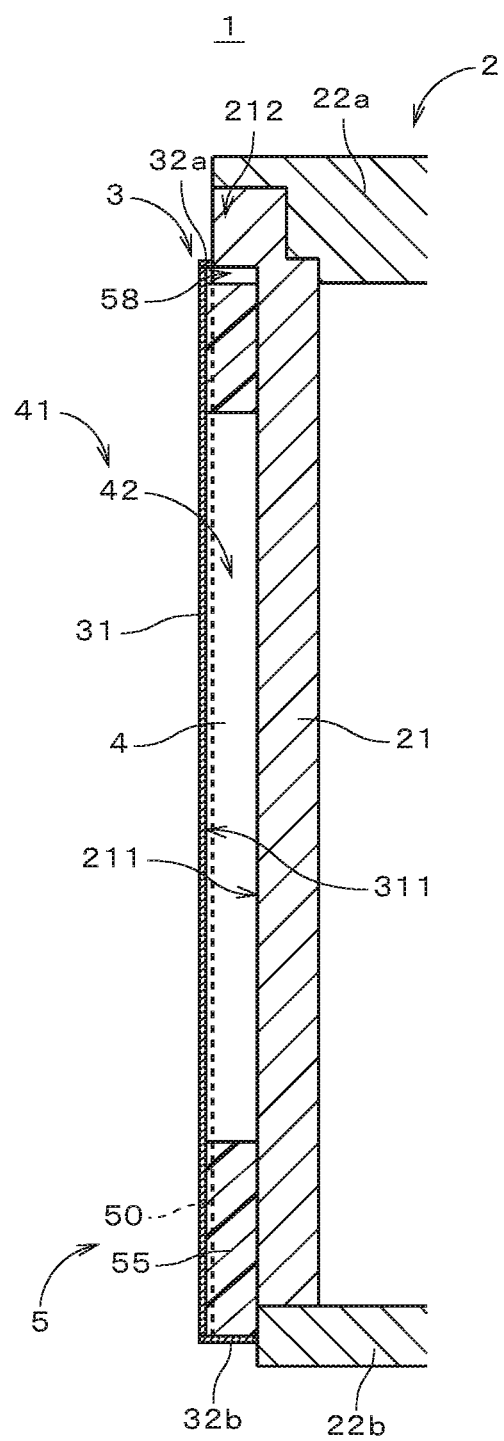
FIG. 3 is a sectional view of the cask.

FIGS. 2 and 3 illustrate part of a section of the cask 1 (in the vicinity of a later-described outer cylinder 3). FIG. 2 illustrates a section of the cask 1 that is perpendicular to the central axis J1, and FIG. 3 illustrates a section of the cask 1 that includes the central axis J1.

The cask 1 includes a cask body 2, the outer cylinder 3, a plurality of fins (heat conduction fins) 4, and a plurality of neutron shields 5. The cask body 2 is a tubular container with the central axis J1 as its center. The cask body 2 is formed of a metal such as carbon steel. The cask body 2 includes a body side wall 21 and two body ends 22a and 22b. For example, the body side wall 21 has a substantially circular cylindrical shape extending in the axial direction. Each of the body ends 22a and 22b has a substantially circular columnar shape or substantially disk-like shape. The two body ends 22a and 22b respectively block openings at the opposite ends of the body side wall 21 in the axial direction. In the example in FIG. 3, both of the body ends 22a and 22b serve as removable lids. For example, the body ends 22a and 22b are fixed with bolts to the body side wall 21. Depending on the design of the cask body 2, one of the body ends may be integrally formed with the body side wall 21. By removing the body ends serving as lids, the cask 1 is capable of housing a plurality of fuel assemblies 9 (see FIG. 1) in the cask body 2. In actuality, the internal space of the cask body 2 is partitioned by baskets so as to prevent the fuel assemblies 9 from coming in contact with one another.

The outer cylinder 3 has a tubular shape with the central axis J1 as its center and surrounds the body side wall 21 of the cask body 2. The outer cylinder 3 is formed of a metal such as carbon steel. The outer cylinder 3 includes an outer-cylinder side wall 31 and two outer-cylinder ends 32a and 32b (see FIG. 3). For example, the outer-cylinder side wall 31 has a substantially circular cylindrical shape extending in the axial direction. The diameter of the outer-cylinder side wall 31 is larger than the diameter of the body side wall 21. A tubular space 41 with the central axis J1 as its center is formed between the body side wall 21 and the outer-cylinder side wall 31, i.e., between an outer peripheral surface 211 of the cask body 2 and an inner peripheral surface 311 of the outer cylinder 3. The tubular space 41 has a substantially circular ring shape in a section perpendicular to the central axis J1. The tubular space 41 extends along the entire length of the outer-cylinder side wall 31 in the axial direction. The two outer-cylinder ends 32a and 32b have substantially circular ring shapes and respectively block (almost seal) the opposite ends of the tubular space 41 in the axial direction. For example, the outer-cylinder ends 32a and 32b are bonded to the outer-cylinder side wall 31 and the body side wall 21 by welding or other methods.

The fins 4 are aligned in a circumferential direction around the central axis J1 in the tubular space 41. The fins 4 are formed of a metal such as copper. Each fin 4 is a heat conduction member that connects the outer peripheral surface 211 of the cask body 2 and the inner peripheral surface 311 of the outer cylinder 3. For example, each fin 4 is welded to the body side wall 21 and the outer-cylinder side wall 31. The locations of connection of the fins 4 to the outer peripheral surface 211 of the cask body 2 are arranged at almost regular intervals in the circumferential direction. The locations of connection of the fins 4 to the inner peripheral surface 311 of the outer cylinder 3 are also arranged at almost regular intervals in the circumferential direction. In the cask 1, the tubular space 41 is divided into a plurality of divided spaces 42 (see FIG. 2) by the fins 4. Each divided space 42 is a space filled with a later-described neutron shielding material. The fins 4 have a smaller length in the axial direction than the outer cylinder 3. In the example in FIG. 3, the fins 4 are not provided in opposite end portions of the outer cylinder 3 in the axial direction, and the fins 4 are provided only in a central portion of the outer cylinder 3.

As illustrated in FIG. 2, the neutron shields 5 are provided respectively in the divided spaces 42. In actuality, every divided space 42 is provided with a neutron shield 5. Each neutron shield 5 includes a molded pipe portion 50 and a filled portion 55. The molded pipe portion 50 is formed of a neutron shielding material. The neutron shielding material is, for example, a polymeric material containing large amounts of hydrogen, and is also called a "resin." The neutron shielding material can serve as a shield against neutrons. One example of the neutron shielding material is an epoxy resin obtained by mixing boron carbide ($B_4C$) and aluminum hydroxide. The neutron shielding material is thermoplastic. The molded pipe portion 50 extends in the axial direction and has approximately the same length as the outer cylinder 3. The molded pipe portion 50 has a hollow portion 59 extending along the entire length thereof in the axial direction. As will be described later, the molded pipe portion 50 is an assembly of a plurality of precast members 51 and 52.

The filled portion 55 is formed of a neutron shielding material that fills the spaces between the molded pipe portion 50, the body side wall 21, the outer-cylinder side wall 31, and the fins 4, i.e., the space between the molded pipe portion 50 and the outer edge of the divided space 42. The filled portion 55 is in the form of a hardened body of the neutron shielding material at atmospheric temperatures. The neutron shielding material forming the filled portion 55 is preferably of the same type as the neutron shielding material forming the molded pipe portion 50. In this case, the molded pipe portion 50 and the filled portion 55 can be regarded as being almost integral. The molded pipe portion 50 and the filled portion 55 do not necessarily have to have a definite boundary. The neutron shields 5 are hollow structures formed of the neutron shielding materials. Since, as described previously, the fins 4 are not provided in the opposite end portions of the outer cylinder 3 in the axial direction, the filled portions 55 of the neutron shields 5 in these opposite end portions are continuous in the circumferential direction. In the following description, the neutron shielding material for the filled portions 55 and the neutron shielding material for the molded pipe portion 50 are assumed to be of the same type, but they may be of different types.

Figure 4:
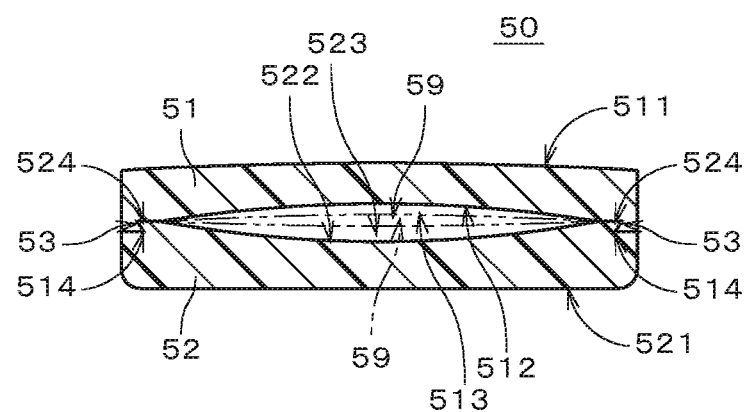
FIG. 4 is a sectional view of a molded pipe portion.
Figure 5:
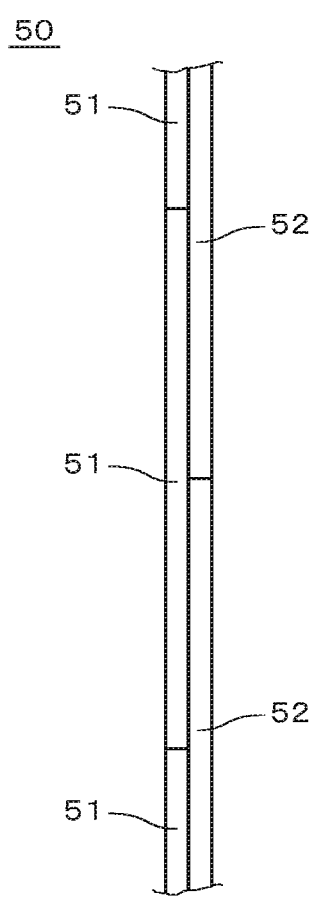
FIG. 5 illustrates the molded pipe portion.

FIGS. 4 and 5 illustrate one molded pipe portion 50. FIG. 4 illustrates a section of the molded pipe portion 50 that is perpendicular to the axial direction, and FIG. 5 illustrates the molded pipe portion 50 as viewed in the circumferential direction. The molded pipe portion 50 includes a plurality of precast members 51 and 52. Each of the precast members 51 and 52 is an elongated molded member that is obtained in advance through molding (casting) of a neutron shielding material in an external device, and is a hardened body of the neutron shielding material. In the section of the molded pipe portion 50 that is perpendicular to the axial direction, the hollow portion 59 is surrounded (formed) by two precast members 51 and 52 as illustrated in FIG. 4. That is, the molded pipe portion 50 includes a first precast member 51 disposed on one side of the hollow portion 59, and a second precast member 52 disposed on the other side of the hollow portion 59 and joined to the first precast member 51 so as to surround the hollow portion 59 with the first precast member 51. An outer surface 511 of the first precast member 51 on the side opposite the hollow portion 59 has an arc-shaped outside shape. In the divided space 42, the outer surface 511 of the first precast member 51 is arranged so as to extend along the inner peripheral surface 311 of the outer cylinder 3 (see FIG. 2). An outer surface 521 of the second precast member 52 on the side opposite the hollow portion 59 has a linear outside shape.

In the section of the molded pipe portion 50 illustrated in FIG. 4, an inner surface 512 of the first precast member 51 on the side opposite the outer surface 511 has a substantially arc-shaped recess 513. The recess 513 is depressed on the side opposite the second precast member 52. The inner surface 512 has stepped portions 514 on opposite outer sides of the recess 513. Parts of the stepped portions 514 that are away from the recess 513 protrude on the side opposite the outer surface 511. The edges of the stepped portions 514 have a Z-shape (dovetail shape). An inner surface 522 of the second precast member 52 on the side opposite the outer surface 521 has a substantially arc-shaped recess 523. The recess 523 is depressed on the side opposite the first precast member 51. The inner surface 522 has stepped portions 524 on opposite outer sides of the recess 523. Parts of the stepped portions 524 that are away from the recess 523 are depressed toward the outer surface 521. The edges of the stepped portions 524 have a Z shape. For example, sectional shapes of the first precast member 51 and the second precast member 52 remain constant in the axial direction.

The molded pipe portion 50 has joints 53 formed by engagement between the stepped portions 514 of the first precast member 51 and the stepped portions 524 of the second precast member 52. In the section of the molded pipe portion 50, boundary lines between the stepped portions 514 and the stepped portions 524 turn back at acute angles multiple times into a Z shape, so that each joint 53 has a labyrinth structure. With the first precast member 51 and the second precast member 52 joined together, the recess 513 of the first precast member 51 and the recess 523 of the second precast member 52 oppose each other and form the previously described hollow portion 59. In the section of the molded pipe portion 50 that is perpendicular to the axial direction, the hollow portion 59 has a shape extending in the circumferential direction (in a substantially lateral direction in FIG. 4). The width of the hollow portion 59 in a radial direction (in a substantially longitudinal direction in FIG. 4) perpendicular to the circumferential direction becomes a maximum in the central portion in the circumferential direction and gradually decreases as the hollow portion 59 approaches each joint 53. In principle, each divided space 42, except the hollow portion 59 and a later-described auxiliary void portion 58, is filled with the neutron shielding material. In the following description, the hollow portion 59 is referred to as a "void portion 59."

As illustrated in FIG. 5, the molded pipe portion 50 includes a plurality of first precast members 51 coupled to one another in the axial direction, and a plurality of second precast members 52 coupled to one another in the axial direction. The first precast members 51 have the same structure. Each two first precast members 51 adjacent in the axial direction are coupled to each other, with their ends bonded together with an adhesive. The adhesive preferably contains a neutron shielding material, and more preferably contains a neutron shielding material that is of the same type as the neutron shielding material of the precast members 51 and 52 and the filled portion 55. The second precast members 52 have the same structure. Each two second precast members 52 adjacent in the axial direction are coupled to each other, with their ends bonded together with an adhesive. Each location of coupling between the first precast members 51 differs in the axial direction from any location of coupling between the second precast members 52.

As illustrated in FIG. 3, spaces around the molded pipe portions 50 in the divided spaces 42, except the vicinity of the one outer-cylinder end 32a, are filled with the neutron shielding material serving as the filled portions 55. In portions of the divided spaces 42 between the outer-cylinder end 32a and end faces of the filled portions 55, the auxiliary void portions 58 are provided as spaces where the neutron shielding material does not exist. In each divided space 42, the void portion 59 and the auxiliary void portion 58 are filled with air.

In the cask 1, the body ends 22a and 22b are also provided with a member (e.g., circular disk-like member) of a neutron shielding material, which is not shown. The neutron shielding materials of the neutron shields 5 and the body ends 22a and 22b serve as shields against the radiation of neutrons emitted from the fuel assemblies 9 to the outside when the fuel assemblies 9 are housed in the cask body 2. In actuality, the neutron shielding materials are not disposed in all directions around the fuel assemblies 9 housed in the cask body 2, and for example, the auxiliary void portions 58 may be shieldless portions that do not serve as shields against neutrons.

In the cask 1 housing the fuel assemblies 9, the temperature of the cask body 2 increases due to, for example, decay heat emanating from the fuel assemblies 9, and following this, the temperatures of the neutron shields 5, the fins 4, and the outer cylinder 3 increase as well. For example, the temperatures of the neutron shields 5 rise up to temperatures (120 to 130° C.) higher than the glass transition point of the neutron shielding material. At this time, the neutron shielding material has a higher thermal expansion coefficient than the metal materials for the cask body 2, the fins 4, and the outer cylinder 3, and the neutron shielding material expands to a greater degree in volume than the metal materials. The neutron shielding material has the property of turning into rubber-like form as its temperature becomes higher than the glass transition point. In the actual cask 1, thermal expansion of the neutron shielding material causes the neutron shields 5 (molded pipe portions 50 and filled portions 55) to become deformed so as to reduce the cross-sectional areas of the void portions 59 that are perpendicular to the axial direction, as indicated by chain double-dashed lines in FIG. 4. To be more specific, the amount of change in the width of each void portion 59 in the radial direction becomes a maximum in the central portion in the circumferential direction and gradually decreases as the void portion 59 approaches the joints 53. Accordingly, the deformed void portion 59 has almost a constant width in the circumferential direction, i.e., the void portion 59 has a substantially linear shape in the circumferential direction.

As described above, in the neutron shields 5, the neutron shielding material expands so as to compress the void portions 59, and this relatively reduces stress that may be exerted on the outer-cylinder side walls 31 and the body side walls 21 by thermal expansion of the neutron shielding material. In other words, thermal stress on the outer-cylinder side walls 31 and the body side walls 21 are absorbed by the contraction of the void portions 59. In actuality, the neutron shielding material also expands in the axial direction. At this time, the neutron shielding material extends in the axial direction so as to reduce the sizes of the auxiliary void portions 58, so that excessively great stress is not exerted on the outer-cylinder ends 32a and 32b.

After several to several tens of years have passed since housing of the fuel assemblies 9 in the cask 1, decay heat or the like emanating from the fuel assemblies 9 decreases, and the temperature of the cask 1 as a whole decreases as well. Accordingly, the neutron shielding material in the neutron shields 5 contracts. At this time, in the presence of air in the void portions 59, the neutron shielding material in rubber form contracts so as to increase the cross-sectional areas of the void portions 59 that are perpendicular to the axial direction. That is, the void portions 59 are regenerated. The contraction of the neutron shielding material also expands the auxiliary void portions 58 in a similar manner. Then, the neutron shielding material is hardened when the temperature of the neutron shields 5 becomes lower than the glass transition point of the neutron shielding material. With the neutron shielding material hardened, the neutron shields 5 have approximately the same shape as their shape before housing of the fuel assemblies 9, and unexpected large shieldless portions are not generated.

Figure 6:
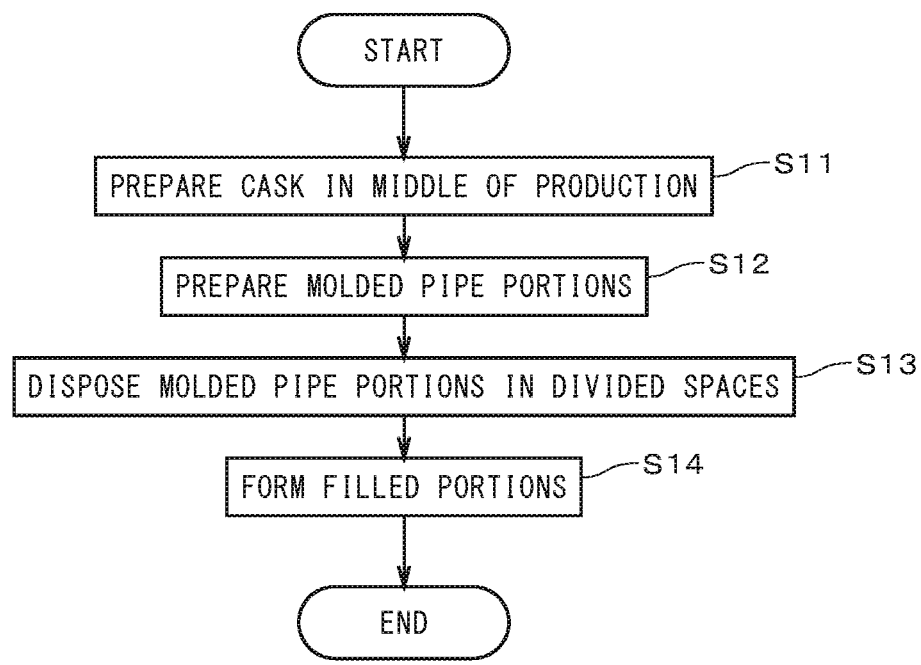
FIG. 6 is a flowchart of production of neutron shields.
Figure 7:
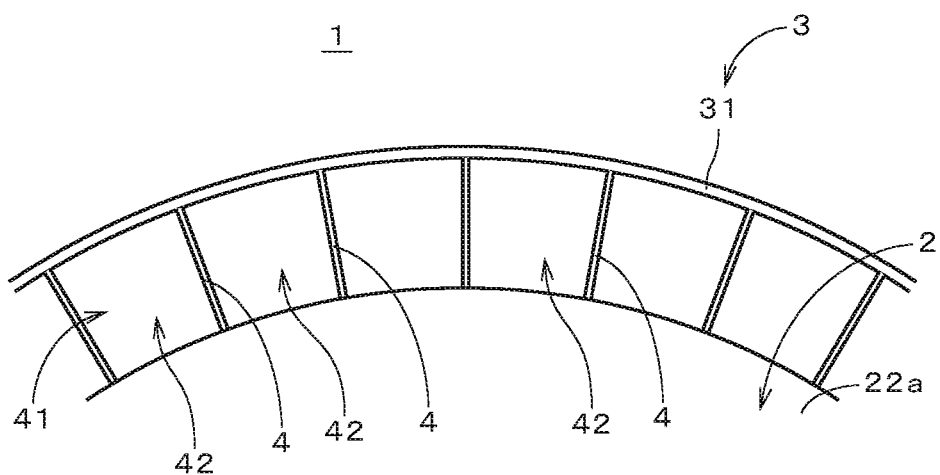
FIG. 7 illustrates a plurality of divided spaces.
Figure 8:
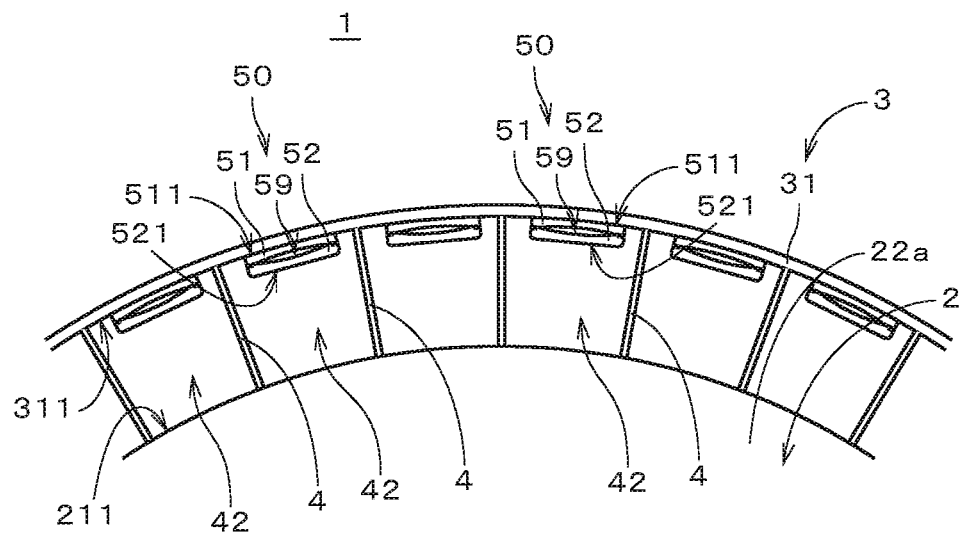
FIG. 8 illustrates the plurality of divided spaces.

Next, the production of the neutron shields 5 in the cask 1 will be described with reference to FIG. 6. In the production of the neutron shields 5, the cask 1 in the middle of production is prepared by attaching the fins 4 to the outer peripheral surface 211 of the cask body 2 and attaching the outer cylinder 3 to the fins 4 (step S11). In the cask 1 in the middle of production, one ends (lower ends in FIG. 3) of the outer-cylinder side wall 31 and the body side wall 21 are bonded to the outer-cylinder end 32b, and the other ends thereof (upper ends in FIG. 3) have not yet been bonded to the outer-cylinder end 32a. The cask 1 in the middle of production is held, with the outer-cylinder end 32b disposed on the underside of the outer-cylinder side wall 31 in the vertical direction. When the cask 1 is viewed downward from above, the divided spaces 42 are upwardly open as illustrated in FIG. 7. In actuality, as illustrated in FIG. 3, the upper portion of the body side wall 21 has a flange 212 that protrudes radially outward, and the body end 22a has a portion that overlaps the flange 212 in the axial direction. FIG. 7 and FIG. 8, which is later described, do not illustrate the flange 212 and the aforementioned portion of the body ends 22a, which overlap the divided spaces 42 in the axial direction.

Then, the molded pipe portions 50 are prepared (step S12). As described previously, the molded pipe portions 50 are assemblies of a plurality of first precast members 51 and a plurality of second precast members 52. In assembly of the molded pipe portions 50, either one of the first precast member 51 and the second precast member 52 are moved in the axial direction (longitudinal direction) relative to the other member, so that the stepped portions of the one member are fitted into the stepped portions of the other member. Accordingly, the first precast member 51 and the second precast member 52 are joined together. The above operation is repeated for the plurality of first precast members 51 and the plurality of second precast members 52, so that the first precast members 51 are coupled to one another in the axial direction and the second precast members 52 are coupled to one another in the axial direction. As a result, the molded pipe portions 50 with the void portions 59 extending in the axial direction are assembled.

In the assembly of the molded pipe portions 50, an adhesive is used to couple the first precast members 51 together and to couple the second precast members 52 together. This prevents or reduces the possibility that, in the case of forming the filled portions 55, which will be described later, the neutron shielding material enters the void portions 59 from the locations of coupling between the first precast members 51 and the locations of coupling between the second precast members 52. In the preferable molded pipe portions 50, the locations of coupling between the first precast members 51 differ in the axial direction from the locations of coupling between the second precast members 52. Therefore, in the case of coupling each two of the first precast members 51 together, the alignment of these two first precast members 51 is completed by fitting the stepped portions 514 of the two first precast members 51 into the stepped portion 524 of one second precast member 52. The same applies to the case of coupling each two of the second precast members 52 together. Note that this adhesive is not used at the joints 53 of the first precast members 51 and the second precast members 52. The adhesive may be used at the joints 53.

After the molded pipe portions 50 have been prepared, the molded pipe portions 50 are respectively disposed in the divided spaces 42 of the cask 1 in the middle of production as illustrated in FIG. 8 (step S13). As described previously, each divided space 42 is upwardly open, so that each molded pipe portion 50 can be inserted into the divided space 42 from above the divided space 42 (through a clearance between the outer edge of the flange 212 and the inner peripheral surface 311 of the outer-cylinder side wall 31 in FIG. 3). In the divided spaces 42, the outer surfaces 511 of the first precast members 51 oppose the inner peripheral surface 311 of the outer cylinder 3. In the preferable cask 1, the outer surfaces 511 of the first precast members 51 have almost the same curvatures as the inner peripheral surface 311 of the outer cylinder 3, and the outer surfaces 511 of the first precast members 51 and the inner peripheral surface 311 of the outer cylinder 3 are in contact with each other with almost no clearance therebetween. Note that there may be a clearance between the first precast members 51 and the inner peripheral surface 311 of the outer cylinder 3.

Then, a liquid (or paste-like) neutron shielding material is poured into the tubular space 41. At this time, the lower part of the tubular space 41 is covered with the outer-cylinder end 32b, so that the neutron shielding material does not leak out. The neutron shielding material spreads out in the circumferential direction, i.e., into all the divided spaces 42, from above and below the fins 4. At this time, the outer surfaces 521 of the second precast members 52 are pushed toward the first precast members 51 by the poured neutron shielding material, and the stepped portions 514 of the first precast members 51 and the stepped portions 524 of the second precast members 52 are brought into intimate contact (see FIG. 4). This consequently prevents or reduces the possibility that the neutron shielding material (to be more specific, a liquid component contained in the neutron shielding material and also called a "clear resin") may enter the void portions 59 through clearances between the stepped portions 514 and 524. As described previously, the locations of coupling between the first precast members 51 and the locations of coupling between the second precast members 52 are filled with the adhesive, and therefore the neutron shielding material does not enter the void portions 59 from these coupling locations. Note that the neutron shielding material may penetrate into the spaces between the outer surfaces 511 of the first precast members 51 and the inner peripheral surface 311 of the outer cylinder 3.

The neutron shielding material is poured into the divided spaces 42 until forming a surface of the liquid (or paste-like) neutron shielding material at a position located by a predetermined distance below the upper end face of the outer-cylinder side wall 31 (see FIG. 3). Thereafter, the inpouring of the neutron shielding material is stopped. The liquid neutron shielding material contains a hardener added thereto, so that the neutron shielding material is hardened after the elapse of a predetermined period of time. As described above, the filled portions 55 are formed by filling the spaces between the outer edges of the divided spaces 42 and the molded pipe portions 50 with the neutron shielding material with fluidity and hardening the neutron shielding material (step S14). This completes the production of the neutron shields 5. In actuality, the filled portions 55 of the neutron shields 5 in a range where the fins 4 are not provided in the axial direction are contiguous in the circumferential direction. The neutron shields 5 each include the neutron shielding material with which the divided spaces 42 are filled. After the production of the neutron shields 5, the outer-cylinder end 32a is bonded to the upper ends of the outer-cylinder side wall 31 and the body side wall 21 so as to block the tops of the divided spaces 42.

Figure 9:
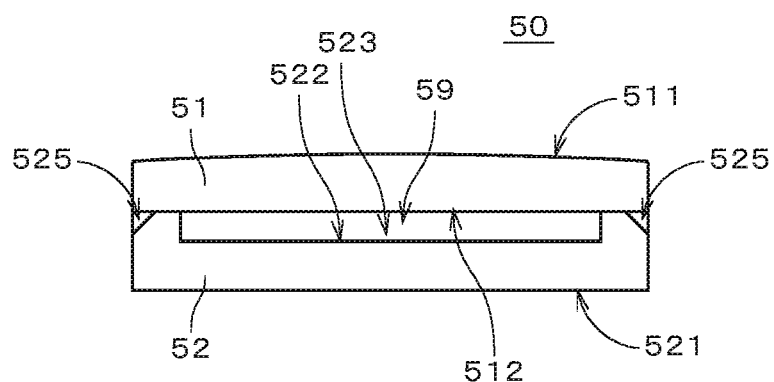
FIG. 9 illustrates a molded pipe portion used in a test specimen.

Next, an experiment using a test specimen that simulates the neutron shields 5 will be described. The test specimen was configured such that the molded pipe portion was disposed in a predetermined metallic container, and the neutron shielding material was charged therearound to form the filled portion. This experiment used the molded pipe portion 50 illustrated in FIG. 9. FIG. 9 illustrates one molded pipe portion 50 as viewed in the axial direction. The molded pipe portion 50 had a thin rectangular void portion 59 and did not have the stepped portions 514 and 524 illustrated in FIG. 4. To be more specific, the inner surface 522 of the second precast member 52 had a recess 523 of a given depth, whereas the inner surface 512 of the first precast member 51 had no recess. The inner surface 522 of the second precast member 52 also had notches 525 on the opposite outer sides of the recess 523, and the first precast member 51 and the second precast member 52 were joined together by applying an adhesive to the notches 525. The container housing the test specimen included a window that enabled the user to observe the void portion 59 of the molded pipe portion 50.

This experiment re-created a temperature change similar to that occurring in the cask 1 housing the fuel assemblies 9, in the test specimen. Specifically, the test specimen was first heated from 20° C. to 150° C. in a constant temperature bath and then held at 150° C. for a predetermined period of time. At this time, it was confirmed through the window of the container that the void portion 59 of the molded pipe portion 50 had become smaller. In actuality, the width of the void portion 59 in the longitudinal direction in FIG. 9 became smaller in the central portion in the lateral direction in FIG. 9 than the widths thereof in the end portions. The pressure calculated from distortion of the container (pressure exerted on the container by the thermally expanding neutron shielding material) was less than 1 MPa. Then, the temperature in the constant temperature bath was reduced from 150° C. to 20° C. At this time, it was confirmed that the size of the void portion 59 had returned to the original size (returned to the size before the experiment).

On the other hand, in a similar experiment conducted when the container was filled with the neutron shielding material, i.e., when the neutron shields 5 did not include the void portions 59, the pressure exerted on the container by the thermally expanding neutron shielding material was higher than or equal to 8 MPa. Accordingly, it can be said that the test specimen provided with the void portion 59 could reduce stress that may be exerted on the container by thermal expansion of the neutron shielding material.

Here, a cask with no molded pipe portions 50 according to a comparative example is assumed. In the cask according to the comparative example, neutron shields are configured by filling the divided spaces 42 as a whole, except the auxiliary void portions 58, with a neutron shielding material without clearance. The neutron shields have solid sections perpendicular to the axial direction. Thus, when the fuel assemblies 9 are housed in the cask body 2, great stress is exerted on the outer-cylinder side wall 31 and the body side wall 21 by thermal expansion of the neutron shielding material of the neutron shields. Besides, the extension of the neutron shielding material in the axial direction also increases, so that it becomes necessary to design large auxiliary void portions 58 in advance. In other words, large shieldless portions (auxiliary void portions 58) need to be provided in a state in which thermal expansion of the neutron shields has not yet occurred, and this deteriorates neutron shielding performance of the cask according to the comparative example. Moreover, in the case where decay heat or the like emanating from the fuel assemblies 9 decreases and the temperatures of the neutron shields drop, the neutron shielding material contracts so as to reduce the cross-sectional areas (areas of the solid section) of the neutron shields that are perpendicular to the axial direction. At this time, clearances may be created between the fins 4 and the neutron shields, which may result in the generation of unexpected shieldless portions.

In the cask 1 illustrated in FIG. 2, on the other hand, each neutron shield 5 extends in the axial direction and includes the void portion 59 surrounded directly by the neutron shielding material. Accordingly, thermal expansion of the neutron shielding material is absorbed by the void portions 59, and it is possible to reduce stress that may be exerted on the outer cylinder 3 or other components by thermal expansion of the neutron shielding material. Besides, the sizes (volumes) of the auxiliary void portions 58 serving as shieldless portions can be reduced. Moreover, in the case where the temperature of the cask 1 has risen and then dropped, the void portions 59 are re-generated and the neutron shields 5 return to their shape before expansion. This suppresses the generation of unexpected shieldless portions.

In a section of the cask 1 that is perpendicular to the axial direction, the void portions 59 have a shape extending in the circumferential direction. This reduces the possibility that a total radial thickness of the neutron shielding material of the neutron shields 5, which relates to the rate of neutron shielding, may greatly vary in the circumferential direction. Moreover, the void portion 59 in FIG. 4 whose width in the central portion in the circumferential direction is greater than the width in the end portions in the circumferential direction has a substantially linear shape extending in the circumferential direction as a result of the thermal expansion of the neutron shielding material. This suppresses the generation of unnecessarily large void portions 59 and suppresses an increase in the size of the cask 1.

Each neutron shield 5 includes the molded pipe portion 50 and the filled portion 55, the molded pipe portion 50 being formed of a molded member of the neutron shielding material and having a hollow portion serving as the void portion 59, and the filled portion 55 being formed of the neutron shielding material that fills the space between the molded pipe portion 50 and the outer edge of the divided space 42. Accordingly, the neutron shields 5 including the void portions 59 can be easily produced. The neutron shielding material for the molded pipe portion 50 and the neutron shielding material for the filled portion 55 are of the same type, which improves compatibility of the molded pipe portion 50 and the filled portion 55 and prevents or suppresses the generation of unexpected clearances (shieldless portions) or the like between the molded pipe portion 50 and the filled portion 55.

Incidentally, for example, it is also conceivable to use neutron shields obtained by filling the internal space of an aluminum or copper honeycomb material with a neutron shielding material in the divided spaces of a cask, as in Japanese Patent Application Laid-Open Nos. 2004-125763 and 2001-318187 (Documents 1 and 2 described above). In such neutron shields, however, the honeycomb material may become deformed due to thermal expansion of the neutron shielding material, and unexpected clearances (shieldless portions) may be generated between the honeycomb material and the neutron shielding material when the neutron shielding material contracts due to a temperature drop in the neutron shields. Besides, the total thickness of the neutron shielding material in the divided spaces is reduced by an amount corresponding to the honeycomb material.

In contrast, in the cask 1, the molded pipe portions 50 themselves are formed of a neutron shielding material. Thus, it is possible to prevent the total thickness of the neutron shielding material (rate of neutron shielding) from being reduced due to the presence of members formed of other types of materials. Also, since, as described previously, the void portions 59 are re-generated when the neutron shielding material contracts, it is possible to suppress the generation of unexpected shieldless portions.

In the production of the neutron shields 5, the molded pipe portions 50 are formed of divided precast portions (a plurality of precast members 51 and 52). Thus, the molded pipe portions 50 can be handled more easily than in the case where the molded pipe portions 50 are integrally formed. Besides, the first precast members 51 and the second precast members 52 are joined together by fitting the stepped portions 514 and the stepped portions 524 together. This facilitates the alignment of the first and second precast members.

The labyrinth structure of the joints 53 between the first precast members 51 and the second precast members 52 prevents or suppresses penetration of the liquid (or paste-like) neutron shielding material into the void portions 59 during formation of the filled portions 55. Moreover, since no adhesive is used at the joints 53, it is possible to reduce the amount of adhesive to be used and to reduce the cost necessary for the production of the neutron shields 5. It is also possible to shorten the time required for processing such as the application and hardening of the adhesive and thereby to shorten the time required for the assembly of the molded pipe portions 50. Note that in the molded pipe portion 50 in FIG. 9, the application of the adhesive to the notches 525 without clearance prevents or suppresses penetration of the neutron shielding material into the void portion 59 from clearances between the first precast member 51 and the second precast member 52.

The cask 1 and the method of producing the neutron shields 5 described above may be modified in various ways.

Figure 10:
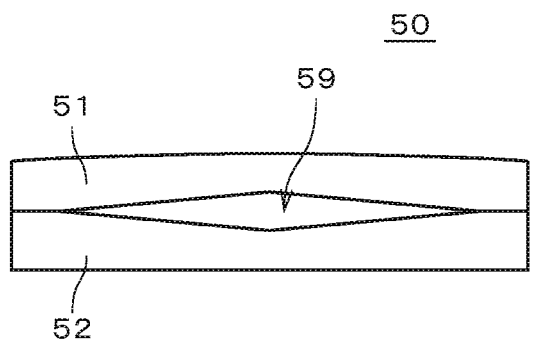
FIG. 10 illustrates another exemplary molded pipe portion.
Figure 11:
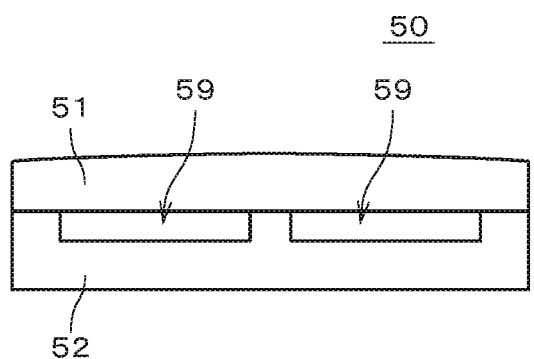
FIG. 11 illustrates another exemplary molded pipe portion.

The molded pipe portions 50 may adopt any other shape in which the width of the void portions 59 becomes a maximum in the central portion in the circumferential direction and gradually degreases as the void portions 59 approach the ends in the circumferential direction. FIG. 10 illustrates one example of such molded pipe portions 50, and the molded pipe portions 50 include the void portions 59 having a rhombic shape extending in the circumferential direction. In this way, the shape of the void portions 59 may be appropriately changed. With the molded pipe portions 50 in FIGS. 4, 9, and 10 in which the void portions 59 have shapes extending in the circumferential direction (and molded pipe portions 50 in FIGS. 11 and 12, which will be described later), it is possible to reduce the possibility that the total radial thickness of the neutron shielding material may vary greatly in the circumferential direction.

Figure 12:
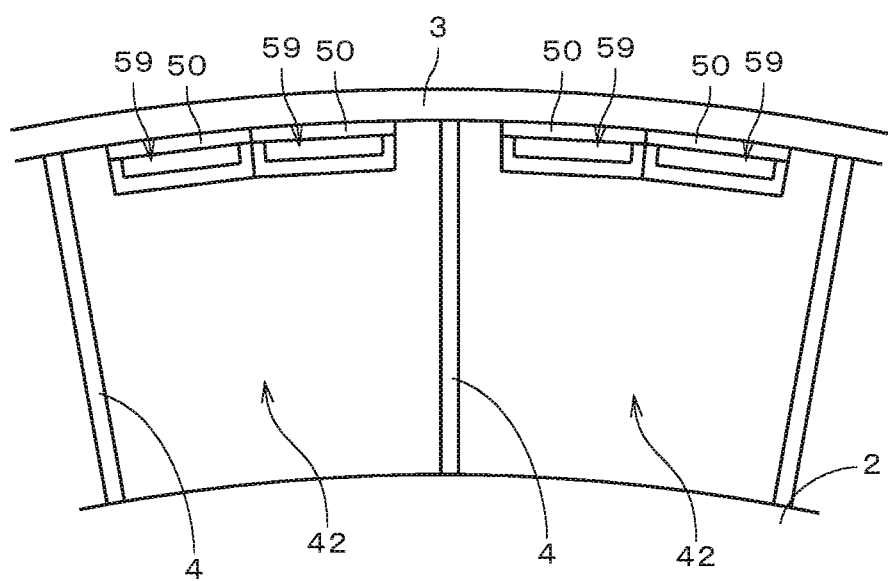
FIG. 12 illustrates another exemplary molded pipe portion.

Each molded pipe portion 50 may include a plurality of void portions 59. In the example illustrated in FIG. 11, two void portions 59 each extending in the axial direction are aligned in the circumferential direction. Also, as illustrated in FIG. 12, each divided space 42 may include a plurality of (in FIG. 12, two) molded pipe portions 50 aligned in the circumferential direction. Depending on the design of the molded pipe portions 50, the cross-sectional shapes and sizes of the void portions 59 may be changed according to the positions of the void portions 59 in the axial direction.

In the divided spaces 42, the void portions 59 do not necessarily have to be located in the vicinity of the outer cylinder 3, and for example, may be located in the vicinity of the cask body 2. Such neutron shields 5 can be easily produced by simply changing the positions of the molded pipe portions 50 in the divided spaces 42 in step S13 in FIG. 6.

The molded member of the molded pipe portions 50 may be formed through machining such as cutting. The molded pipe portions 50 each may be configured of a single molded member. Alternatively, the molded pipe portions 50 each may be configured of three or more molded members at each position in the axial direction. The molded pipe portions 50 may be formed of a material other than a neutron shielding material. This material is usually a material that is not used as a neutron shielding material and is, for example, a resin or the like that contains neither boron nor cadmium. Like the neutron shielding material, this material also preferably has the property of turning into rubber form with a temperature rise. In this case, when the temperature of the cask 1 has risen and then dropped, it is possible to re-generate the void portions 59 and suppress the generation of shieldless portions.

In the above-described cask 1, the filled portions 55 of the neutron shields 5 in the opposite end portions of the outer cylinder 3 in the axial direction are contiguous in the circumferential direction. However, in cases such as where each fin 4 extends from one end of the outer cylinder 3 to the other end thereof, the neutron shields 5 may exist in discontinuous form.

For example, in a section of the cask 1 that is perpendicular to the axial direction, the inclinations of the fins 4 relative to the outer peripheral surface 211 of the cask body 2 may be gradually changed in the circumferential direction, and the divided spaces 42 may have different shapes. Even in this case, the neutron shields 5 can be produced appropriately by the above-described method of producing the neutron shields 5, in which the molded pipe portions 50 are produced by an external device, and the filled portions 55 are formed by filling the spaces between the molded pipe portions 50 and the outer edges of the divided spaces 42 with the neutron shielding material with fluidity. Depending on the design of the cask 1, the molded pipe portions 50 whose outside shapes are formed in accordance with the divided spaces 42 may be inserted into the divided spaces 42 to produce the neutron shields 5.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Cask
2 Cask body
3 Outer cylinder
4 Fin
5 Neutron shield
9 Fuel assembly
41 Tubular space
42 Divided space
50 Molded pipe portion
51 and 52 Precast member
53 Joint
55 Filled portion
59 Void portion (hollow portion)
211 Outer peripheral surface (of cask body)
311 Inner peripheral surface (of outer cylinder)
J1 Central axis
S11 to S14 Step

The invention claimed is:

1. A cask comprising:
a cask body having a tubular shape with a central axis as a center and capable of housing a fuel assembly;
a tubular outer cylinder surrounding said cask body;
a plurality of fins aligned in a circumferential direction in a tubular space formed between said cask body and said outer cylinder, and connecting an outer peripheral surface of said cask body and an inner peripheral surface of said outer cylinder to divide said tubular space into a plurality of divided spaces; and
a plurality of neutron shields containing a neutron shielding material with which said plurality of divided spaces is filled, wherein
each neutron shield includes:
a molded pipe portion including a hollow portion that is a void portion that extends in an axial direction along said central axis; and
a filled portion serving as the neutron shielding material with which a space between said molded pipe portion and an outer edge of a divided space is filled, and
said void portion is surrounded by a neutron shielding material forming said molded pipe portion.

2. The cask according to claim 1, wherein
said molded pipe portion is formed of a molded member of a neutron shielding material.

3. The cask according to claim 1, wherein
said molded pipe portion includes:
a first precast member disposed on one side of said void portion in a section perpendicular to said axial direction; and
a second precast member disposed on the other side of said void portion in said section and joined to said first precast member to surround said void portion with said first precast member.

4. The cask according to claim 3, wherein
a joint between said first precast member and said second precast member has a labyrinth structure.

5. The cask according to claim 1, wherein
said void portion has a shape extending in said circumferential direction in a section perpendicular to said axial direction.

6. A cask comprising:
a cask body having a tubular shape with a central axis as a center and capable of housing a fuel assembly;
a tubular outer cylinder surrounding said cask body;
a plurality of fins aligned in a circumferential direction in a tubular space formed between said cask body and said outer cylinder, and connecting an outer peripheral surface of said cask body and an inner peripheral surface of said outer cylinder to divide said tubular space into a plurality of divided spaces; and
a plurality of neutron shields containing a neutron shielding material with which said plurality of divided spaces is filled, wherein
each neutron shield includes:
a molded pipe portion including a hollow portion that is a void portion that extends in an axial direction along said central axis; and
a filled portion serving as the neutron shielding material with which a space between said molded pipe portion and an outer edge of a divided space is filled, and
said molded pipe portion is surrounded by the neutron shielding material of said filled portion.

7. A method of producing a neutron shield in a cask,
said cask including:
a cask body having a tubular shape with a central axis as a center and capable of housing a fuel assembly;
a tubular outer cylinder surrounding said cask body; and
a plurality of fins aligned in a circumferential direction in a tubular space formed between said cask body and said outer cylinder, and connecting an outer peripheral surface of said cask body and an inner peripheral surface of said outer cylinder to divide said tubular space into a plurality of divided spaces,
the method of producing said neutron shield, comprising:
disposing a molded pipe portion in a divided space, said molded pipe portion including a hollow portion that is a void portion extending in an axial direction along said central axis; and
forming a filled portion by filling a space between said molded pipe portion and an outer edge of said divided space with a neutron shielding material with fluidity and hardening said neutron shielding material, wherein
said void portion is surrounded by a neutron shielding material forming said molded pipe portion.

* * * * *